United States Patent [19]

Jonsson

[11] Patent Number: 4,515,193

[45] Date of Patent: May 7, 1985

[54] CUTTING TOOL AND HOLDER

[76] Inventor: Karl-Erik A. Jonsson, Floraplan 14, S-802 28 Gävle, Sweden

[21] Appl. No.: 464,848

[22] Filed: Feb. 8, 1983

[30] Foreign Application Priority Data

Feb. 12, 1982 [SE] Sweden ............................ 8200869

[51] Int. Cl.$^3$ .............................................. B27C 1/14
[52] U.S. Cl. ................................ 144/172; 144/162 R; 144/176; 144/241; 241/294
[58] Field of Search ............... 144/162 R, 162 A, 172, 144/173, 174, 176, 218, 241; 241/294; 407/7, 113

[56] References Cited

U.S. PATENT DOCUMENTS 3,860,051 1/1975 Anson ............................ 144/241

Primary Examiner—W. D. Bray
Assistant Examiner—Jorji M. Griffin
Attorney, Agent, or Firm—Pollock, Vande Sande & Priddy

[57] ABSTRACT

A cutting tool and holder combination including a cylindrical tool having a cutting edge in at least one of its ends and at least one annular guide groove around its periphery. The tool holder includes a part-cylindrical recess in a tool carrier and a clamping device connected to the tool carrier. The clamping device includes a part-cylindrical surface adapted to be pressed towards the part-cylindrical recess, thereby clamping the tool between this surface and recess. The recess includes at least one part-annular guide ridge corresponding to the annular guide groove of the tool. Axial displacement of the tool is prevented by engagement of the ridge in the groove. Rotation of the tool may take place upon untightening of the clamping device.

14 Claims, 12 Drawing Figures

CUTTING TOOL AND HOLDER

The present invention concerns a cylindrical cutting tool having a cutting edge in at least one of its ends, and being provided with means for its attachment to a tool carrier. The invention also concerns tool holding means for attaching such cylindrical cutting tool to a tool carrier.

Various tools of this general kind are disclosed in U.S. Pat. Nos. 2,805,695; 3,675,693; 3,860,051 and Swiss Patent Nos. 258,369. All these tools have a diameter to axial length ratio less or much less than 1. Such relatively long cylindrical bodies are comparatively easy to position with sufficient accuracy in a corresponding shaped holder. When, for some reason, there is a need for a cylindrical tool having a relatively large diameter, i.e., a diameter to axial length ratio equal to 1 or larger than 1, certain problems are encountered when it comes to achieving a high precision positioning of the tool, particularly when such positioning is to be combined with an absolutely unyielding axial attachment of the tool. An arrangement similar to those of U.S. Pat. Nos. 3,675,693 and 3,860,051, where a tool is threadedly engaged in a tool carrier, to some extent solves these problems, but only in cases, where axial displacement is acceptable in combination with rotation of the tool.

Consequently, an object of the invention is to provide a relatively short cylindrical tool with means enabling a more accurate positioning of the tool and more stable attachment thereof to a tool carrier such as, for instance, a wood chipper drum.

A further object of the invention is also to provide holding means for accurate positioning of a cylindrical cutting tool and for its stable but readily loosable attachment to a tool carrier.

In particular, the combination of such tool and such holding means provides accurate, fast and reproduceable positioning of the tool in any of a plurality of angularly varied positions. When fixed in a chosen position, the tool yields neither to normal axially directed cutting forces nor to forces tending to twist the tool.

In a cutting tool comprising a body having the basic shape of a straight circular cylinder, and having in at least one of its ends a cutting edge, the first of the objects mentioned above is realized by providing the tool body between its ends with at least one circumferential annular groove located in a radial plane of the body. Preferably the at least one groove is situated symmetrically between the ends of the body, particularly when there is an edge in each end.

The second of the objects mentioned above is realized by holding means including a part-cylindrical recess in the surface of a tool carrier, said recess having a part-annular ridge concentric to the axis of the part-cylindrical recess, and clamping means connected to the tool carrier and including a part-cylindrical surface adapted to clamp a cylindrical tool between it and the recess of the tool carrier.

The invention will now be described more in detail, reference being made to the accompanying drawings, wherein, FIG. 1 is a section taken along the line I—I of FIG. 2 through an embodiment of the tool according to the invention and through an embodiment of a holding means according to the invention holding the tool in a tool carrier;

Figure 1:
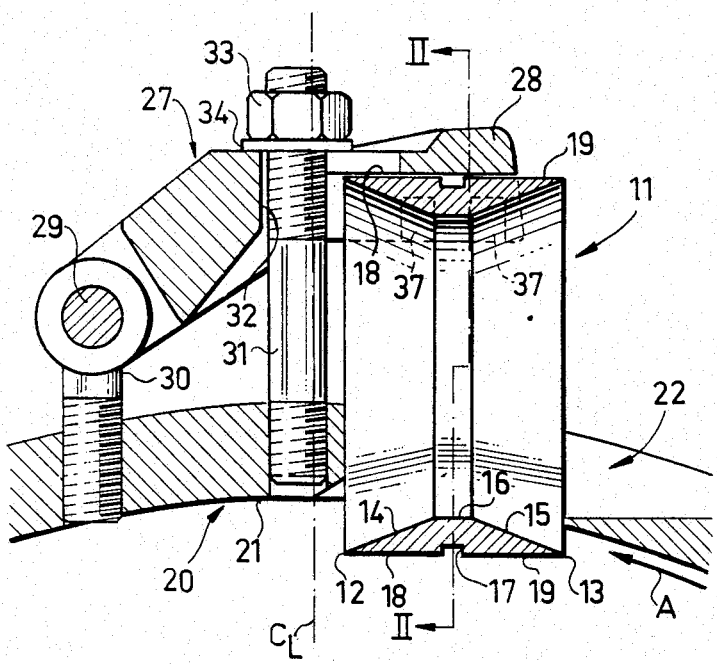
Figure 2:
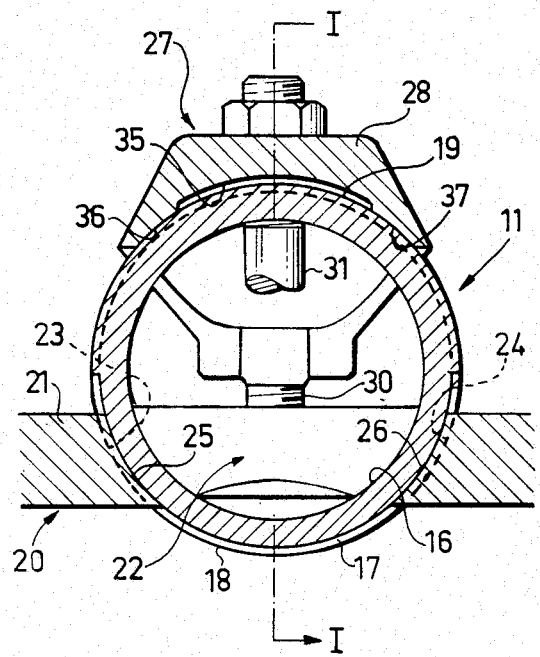
FIG. 2 is a section taken along the line II—II of FIG. 1.

The cutting tool or knife shown in FIGS. 1 and 2 comprises a cylindrical, completely symmetrical tubular body 11 which is provided in each of its ends with an annularly closed cutting edge 12,13 having an internal bevel 14 and 15, respectively. Between the bevels 14 and 15 there is an annular cylindrical surface 16.

Around the external circumference runs an annular guide groove 17 which is located centrally betwen the edges 12 and 13. The groove 17 divides the cylindrical envelope surface of the body 11 in two equal surfaces 18 and 19.

In FIGS. 1 and 2 the knife 11 is shown being mounted by means of a holding device according to the invention on a circularly curved, shell-shaped carrier 20, of which only a portion is shown. The carrier may be, for instance, a rotationally driveable drum which may be provided with a plurality of knives. The center line of the carrier is designated $C_L$. In the wall 21 of the carrier is opened a recess 22 for the knife 11. The recess has, as is shown in FIG. 2, a basic shape adapted to the envelope surface 18, 19 of the knife, i.e. a part-cylindrical surface, which as a maximum can be semi-cylindrical. In this example the knife is intended to operate on the inside of the wall 21 of the carrier 20, and, therefore, the recess extends through the wall 21, so that a portion of the knife, e.g., a certain arc of the left hand edge according to FIG. 1, can be operative. The part-cylindrical surface of the recess 22 is thus divided into two surfaces 23 and 24, which serve as counter-surfaces for those portions of the surfaces 18 and 19 of the knife that serve as supporting surfaces.

The length of the recess 22 corresponds to the initial length of the tool 11, in its axial direction but is preferably somewhat longer, e.g., a tenth of a millimeter or so, so that the edges 12 and 13 are not damaged if the tool should be somewhat dislocated. In order to eliminate such dislocation in an axial direction, the recess is provided, at the middle of its length, with a guide ridge adapted to the guide groove 17, the guide ridge in this instance being divided into two guide ridges 25 and 26.

To keep the knife in its intended position, the holding device according to the invention comprises, apart from the recess 22, a clamping means 27, which includes a pressure member 28, which in one of its ends is pivotably journalled about a shaft 29 in an eyebolt 30, which in turn is screwed in the carrier 20. In the carrier is also screwed a bolt 31 threaded in both its ends end extending through a hole 32 in the pressure member 28 approximately half-way between the shaft 29 and the free end of the pressure member. A nut 33 is screwed on the free end of the bolt 31 and presses via a washer 34 against the flat upper face of the pressure member 28.

On its underside the free end of the pressure member 28 is arcuately curved and is provided with a part-cylindrical pressure surface conformed to the envelope surface 18,19 of the tool. By means of an arcuate recess 35 having a greater radius than the pressure surface, the latter is divided into two pressure surfaces 36 and 37 (FIG. 2) located at equal distances from the center of the pressure piece. These surfaces serve as counter surfaces to the portions of the envelope surface 18,19 of the tool that serve as clamping surfaces of the tool. The pressure surfaces 36 and 37 can also be sub-divided into one portion acting on each side of the guide groove 17 (FIG. 1).

Figure 3:
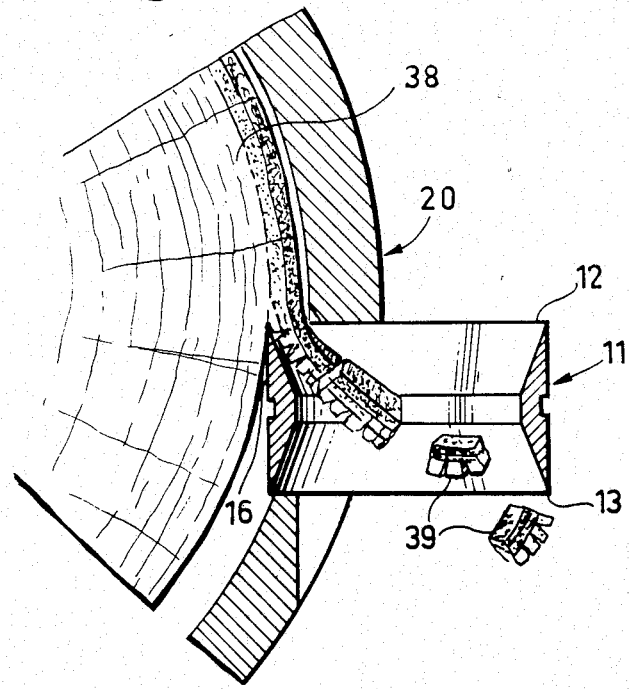
FIG. 3 is a simplified section showing the cutting conditions of the knife according to FIGS. 1 and 2, the tool holder being omitted.

The carrier 20 is arranged to rotate counter-clockwise in the direction of arrow A such that the lower portion of the edge 12 cuts chips from the object to be treated. As an example, FIG. 3 in a simplified manner shows a piece of round timber 38 being treated with the cutting tool 11. The resulting chips 39 are disposed of through the tool. As appears, there is a good clearance between the surface 18 of the tool and the piece of timber. This clearance has been achieved in that the operative edge 12 of the tool is parallelly displaced away from the center line $C_L$ of the carrier 20 towards the direction of rotation of the carrier, as best appears from FIG. 1.

Upon wear of the active portion of the edge 12, the nut 33 is loosened and the tool 11 can be manually rotated about its axis under guidance by the groove 17 and the ridges 25 and 26, such that a new edge portion comes into operative position, whereupon the nut 33 is again tightened. After wear of the entire edge 12, the nut 33 is completely loosened such that the pressure piece 28 can be pivoted about the shaft 29 and the tool taken out of the recess 22 and turned 180° in order to bring the edge 13 into operative position.

Figure 4:
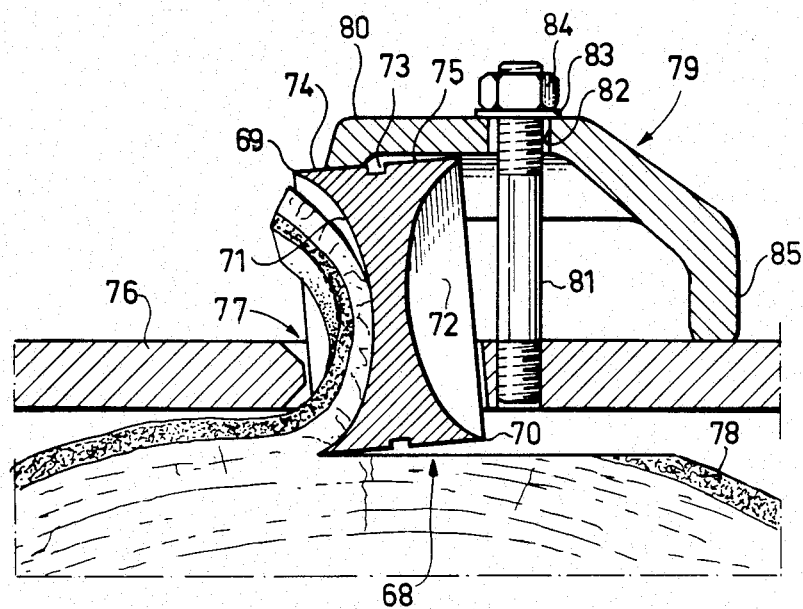
FIG. 4 is a section similar to that according to FIG. 1 but taken through other embodiments of tool and holding means according to the invention.

FIG. 4 shows a further embodiment of the cutting tool according to the invention, which comprises a massive cylindrical body 68 provided in each end with an annularly closed edge 69,70. These edges are created by concave bowl-shaped recesses 71,72 formed in the ends of the body 68. As in the embodiment described above, an annular guide groove 73 running centrally about the cylindrical periphery divides the envelope surface of the body into two cylindrical clamping and support surfaces 74 and 75.

The cutting tool 68 is mounted in a carrier 76, which is plane in the section shown and like the carrier according to FIG. 1 is provided with a recess 77 also having part-cylindrical counter surfaces and guide ridges.

In order to obtain a desired clearance behind the active edge 69 between the surface 74,75 of the tool and the object worked—in this case a piece of timber 78 which is rectilinearly worked across the grain with the edge tangent to the fibers—the counter surfaces and the guide ridges of the recess 77 are correspondingly inclined.

The holding device of FIG. 4 further includes a clamping means 79 comprising a pressure member 79 and a bolt 81 threaded in both its ends. One end is screwed into the carrier and the other end extends through a central hole 82 in the pressure member. A nut 84 is secured on the free end of the bolt 81 and presses via an interposed washer 83 against the flat upper face of the pressure member. With a downwardly directed leg 85 the pressure member 79 loosely bears on the carrier 76 and presses with part-cylindrical clamping surfaces (not shown) in its other end against the surface 74 of the tool 68, which surface, thus, in this instance is counter-surface to the clamping surfaces of the pressure member.

Figure 5:
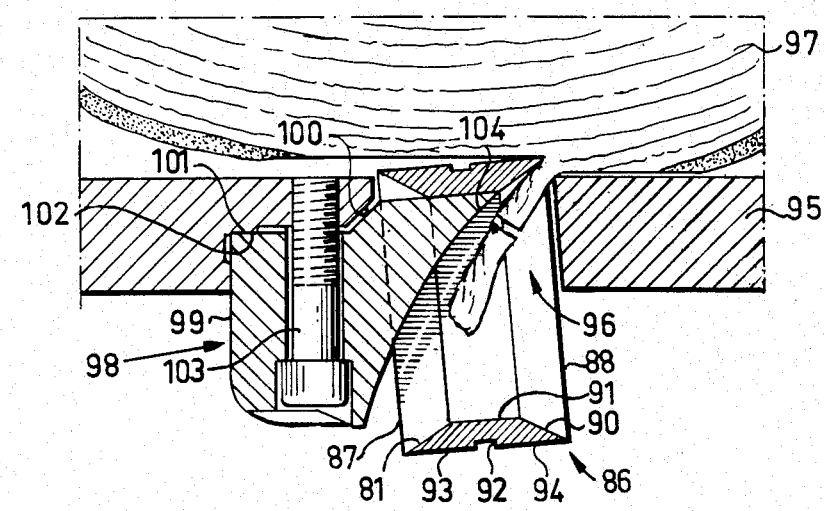
FIG. 5 is a section through a tool similar to that according to FIG. 1 and a further embodiment of holding means.

The cutting tool 86 shown in FIG. 5 is of the kind shown in FIGS. 1 and 2, and, thus has two edges 87,88, internal bevels 89,90 and, between the latter, a cylindrical surface 91. An external guide groove 92 divides the cylindrical envelope surface into two equal surfaces 93 and 94.

Like in FIG. 4 the tool 86 is shown being mounted in a carrier 95, which is plane in the section shown and has a recess 96. In order to obtain clearance the counter surfaces and guide ridges of the recess 96 are inclined against the carrier. Working of a leg 97 is carried out in a similar way as in FIG. 4.

The holding device shown in FIG. 5 further includes a clamping means 98 comprising a pressure member 99 which is let into a recess 100 in the carrier 95 merging in the recess 96. A surface 101 in one end of the pressure member abuts a surface 102 at the recess 100, and a screw 103 screwed into the carrier 95 presses a part-cylindrical surface 104 in the other end of the pressure member against the surface 91 of the tool. In this embodiment, thus, the internal cylindrical surface 91 of the tool serves as clamping surface, and a convex surface of the pressure member as a counter surface thereto.

Figure 6:
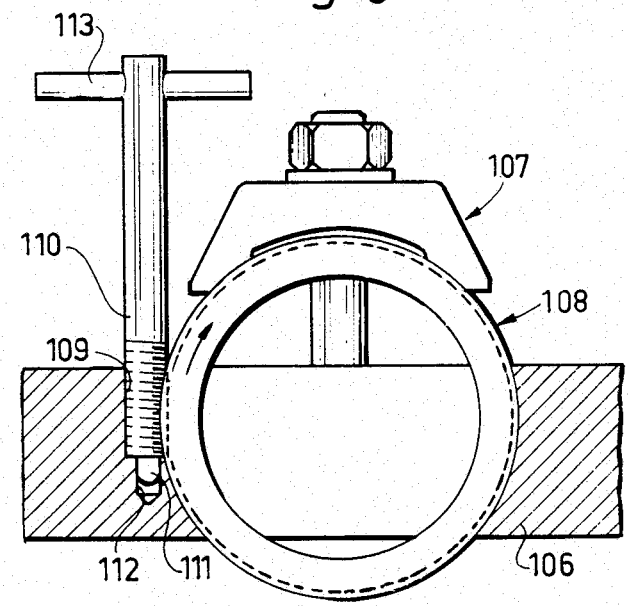
FIG. 6 is a section similar to that according to FIG. 2 showing a device for rotating the tool.

FIG. 6 schematically shows an arrangement for rotating a tool 108 according to the invention held in a carrier 106 by means of a clamping means 107.

Tangent to the tool 108 is opened a cylindrical bore 109 in the carrier 106. Into the bore is introduced a screw 110, the threads of which cooperate with a worm threaded groove in the carrier. The screw 110 has at its leading end a guide pin 111 which is guided in an extension 112 of the bore 109 having a smaller diameter than the latter. To rotate the tool in order to make a new edge portion operative, the screw 110 is screwed, by actuation of its handle 113, down into the bore 109 by means of the cooperating threads. When the screw 110 is screwed down to the bottom of the bore, the clamping means 107 is slightly loosened, whereupon renewed turning of the screw 110 brings about rotation of the tool in the clockwise direction according to FIG. 6.

Figure 7:
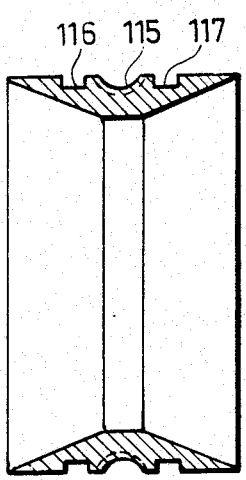
FIG. 7 is a section through a tool having two guide grooves and a worm threaded groove.

The worm threaded groove can be provided at the bottom of a guide groove or be a separate groove. An example of the latter case is shown in FIG. 7, where a cutting tool 114 has a centrally located worm threaded groove 115 and two guide grooves 116 and 117 symmetrically disposed relative to the worm thread groove as well as to the two cutting edges of the tool.

Figure 8:
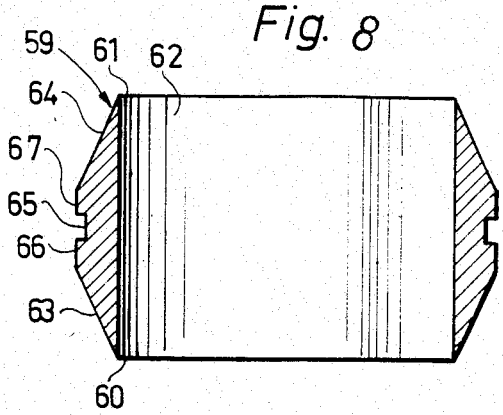
FIG. 8 is a section through a tool according to the invention having external bevels.

FIG. 8 shows a further embodiment of a tubular tool 59 according to the invention. The tool 59 has edges 60 and 61. Contrary to the tubular tools previously described, the tool 59 has an entirely cylindrical inner surface and outer edge-forming bevels 63 and 64. Between the edges 60,61, or, the bevels 63,64 there is a cylindrical surface divided into two equal surfaces 66 and 67 by a central guide recess 65. In this embodiment, where the axial length of the cylindrical outer surface 66,67 is relatively short, the importance of the guide groove 65 is even greater than in those instances where the outer cylindrical surface extends over the entire tool length.

Figure 9:
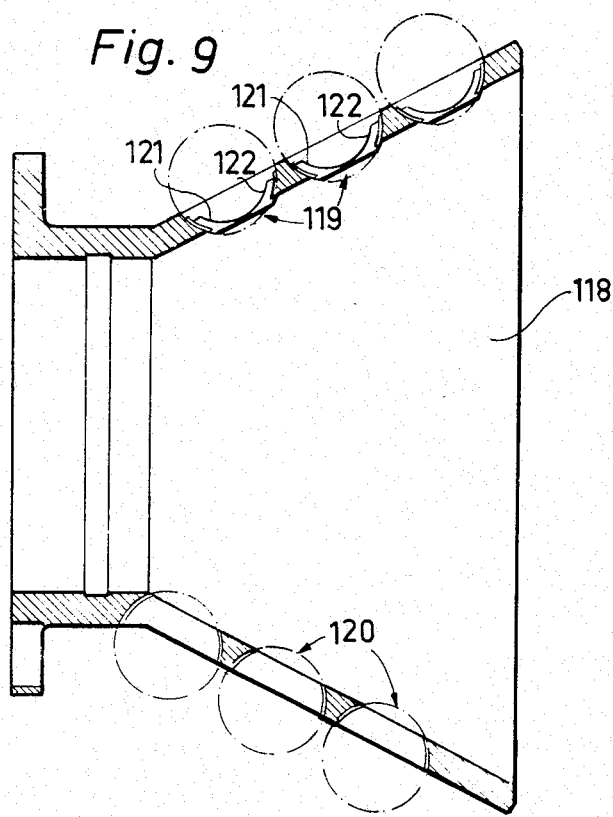
FIG. 9 is an axial section through a tool carrier having a plurality of recesses for tools according to the invention.

FIG. 9 shows a section through a frusto-conical drum 118 which is adapted as a carrier for cutting tools according to the invention. To this purpose the drum 118 is provided with a plurality of recesses 119,120, of which the upper recesses 119 are shown provided with guide ridges 121,122.

Figure 10:
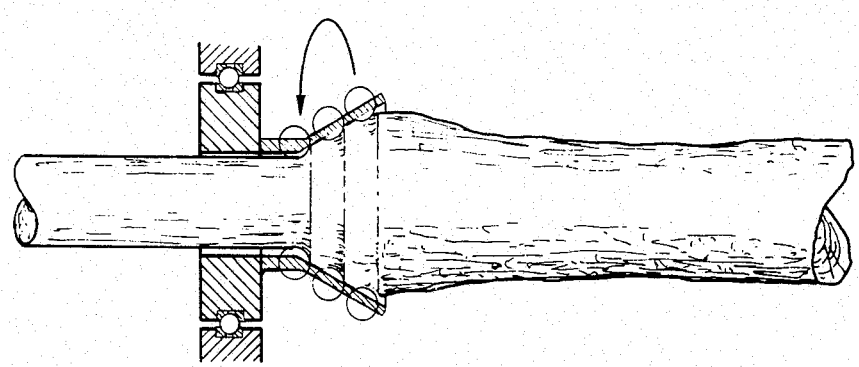
FIGS. 10, 11 and 12 show various examples of apparatuses utilizing the invention.
Figure 11:
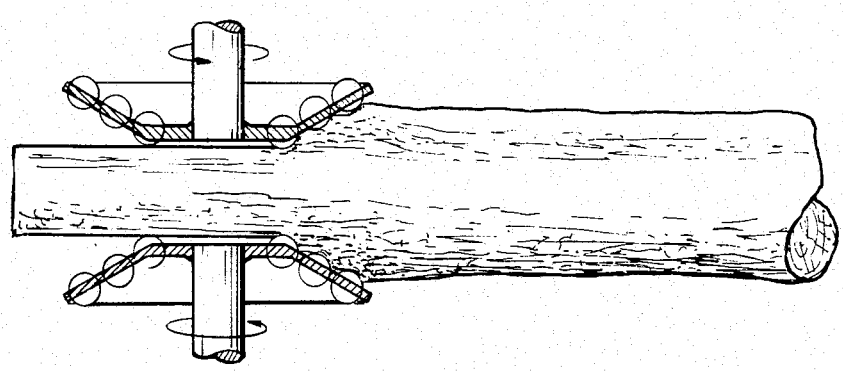
Figure 12:
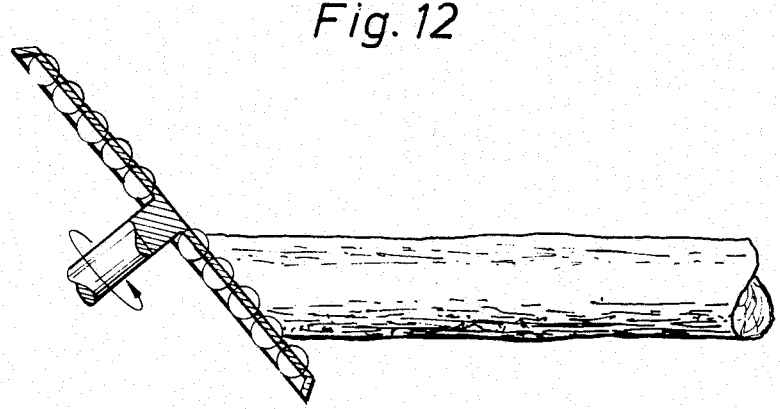

Finally, FIGS. 10-12 schematically show examples of apparatuses utilizing the invention. FIG. 10 shows a round reducer (cf. FIG. 9) in which a log is reduced to a given diameter. FIG. 11 shows a blocking machine or canter, in which a log is given parallel, plane sides. FIG. 12 shows a disc chipper, wherein a log is chopped to chips.

Particular advantages of the invention are as follows:

The axial cutting forces are transmitted from the tool to the carrier mainly by cooperation between the guide groove of the tool and the guide ridge of the carrier. Thus, relatively small clamping forces are needed, which do not deform the tool.

The tool has full axial support immediately behind the operative cutting edge, or, where the recess of the holding means is adapted to receive a relatively large portion of the tool circumference, as in FIGS. 1 and 2, such support is symmetrically located on both sides of the operative edge and as close as possible thereto.

Further, due to the separated clamping surfaces (e.g., 36,37 in FIG. 2) the clamping forces are directed through the tool to the substantially diametrically opposed counter-surfaces (e.g. 23,24 of FIG. 2) of the carrier.

What I claim is:

1. A cutting tool comprising a circular cylindrical body provided with a cutting edge in each end of said body, said body having at least one circumferentially extending closed annular groove located symmetrically between said edges in a radial plane between the ends of said body.

2. A cutting tool according to claim 1, comprising a plurality of grooves located symmetrically between said edges.

3. A cutting tool according to claim 2, wherein each said groove has a rectangular cross-section.

4. A cutting tool according to claim 1 or 2, wherein each said groove comprises a worm threaded groove.

5. A cutting tool according to claim 1 or 2, having a diameter to axial length ratio substantially within the range 1:1 to 2:1.

6. A holding means for a cylindrical cutting tool having at least one circumferentially extending closed annular groove, including a part-cylindrical recess in a surface of a tool carrier, said recess having part-annular ridge means concentric with the axis of said part-cylindrical recess, said ridge means adapted to engage said annular groove of said cutting tool, and clamping means connected to said tool carrier and including a part-cylindrical surface adapted to clamp a cylindrical tool between it and said part-cylindrical recess of said tool carrier.

7. A holding means according to claim 6, wherein said ridge means comprises at least one ridge located symmetrically in relation to said part-cylindrical recess.

8. A holding means according to claim 6, wherein said ridge means comprises a plurality of ridges located symmetrically in relation to said part-cylindrical recess.

9. A holding means according to claim 7 or 8, wherein each said ridge has a rectangular cross-section.

10. A holding means according to claim 6, wherein said part-cylindrical surface of said clamping means includes two angularly spaced surfaces.

11. A holding means according to claim 6 or 10, wherein said clamping means includes threaded means adapted to exert a clamping force for clamping said tool between said part-cylindrical surface and said part-cylindrical recess.

12. A holding means according to claim 6, including a cylindrical bore in the tool carrier, the axis of said cylindrical bore being substantially tangent to said part-cylindrical recess.

13. In combination, a cylindrical cutting tool and a holder therefor, said tool having a cutting edge in each of its ends and at least one closed annular groove on its periphery located symmetrically between said edges, and said holder including a part-cylindrical recess in a surface of a tool carrier and clamping means connected to the tool carrier including a part-cylindrical surface, said part-cylindrical recess and said part-cylindrical surface having a radius corresponding to the radius of said cylindrical cutting tool, said cylindrical recess including part-annular ridge means adapted to engage said groove means such that axial displacement of said tool is prevented when said tool is received in said part-annular recess and clamped between it and said part-cylindrical surface.

14. A cutting tool comprising a circular cylindrical body provided with a cutting edge in at least one of its ends, said body having at least one circumferentially extending closed annular groove located in a radial plane between the ends of said body.

* * * * *